US008694711B2

(12) United States Patent
Seth-Smith et al.

(10) Patent No.: US 8,694,711 B2
(45) Date of Patent: Apr. 8, 2014

(54) CROSSPOINT SWITCH FOR USE IN VIDEO AND OTHER APPLICATIONS

(75) Inventors: Nigel Seth-Smith, Lymington (GB); John Hudson, Burlington (CA)

(73) Assignee: Semtech Canada Corporation, Burlington, Ontario (CA)

( * ) Notice: Subject to any disclaimer, the term of this patent is extended or adjusted under 35 U.S.C. 154(b) by 258 days.

(21) Appl. No.: 13/138,228

(22) PCT Filed: Jan. 21, 2010

(86) PCT No.: PCT/CA2010/000053
§ 371 (c)(1),
(2), (4) Date: Sep. 8, 2011

(87) PCT Pub. No.: WO2010/083586
PCT Pub. Date: Jul. 29, 2010

(65) Prior Publication Data

US 2011/0320678 A1 Dec. 29, 2011

Related U.S. Application Data

(60) Provisional application No. 61/146,135, filed on Jan. 21, 2009.

(51) Int. Cl.
*G06F 13/00* (2006.01)

(52) U.S. Cl.
USPC ............ 710/317; 710/316; 348/705; 348/706

(58) Field of Classification Search
USPC .................................. 710/316–317; 348/705
See application file for complete search history.

(56) References Cited

U.S. PATENT DOCUMENTS

| | | | | |
|---|---|---|---|---|
| 5,276,445 | A | 1/1994 | Mita et al. | |
| 6,130,725 | A | 10/2000 | Liron | |
| 6,208,667 | B1 * | 3/2001 | Caldara et al. | 370/503 |
| 6,946,948 | B2 * | 9/2005 | McCormack et al. | 340/2.28 |
| 6,972,803 | B2 | 12/2005 | Seth-Smith et al. | |
| 7,113,589 | B2 * | 9/2006 | Mitchler | 379/399.01 |
| 7,542,099 | B2 * | 6/2009 | Ellgen et al. | 348/706 |
| 7,813,381 | B2 * | 10/2010 | Chang et al. | 370/503 |
| 8,345,164 | B2 * | 1/2013 | Hio et al. | 348/705 |
| 2007/0199043 | A1 * | 8/2007 | Morris | 725/143 |
| 2012/0019668 | A1 * | 1/2012 | Seth-Smith et al. | 348/181 |

FOREIGN PATENT DOCUMENTS

| | | | |
|---|---|---|---|
| EP | 0 488 673 | A2 | 6/1992 |
| EP | 0 901 281 | A2 | 3/1999 |

OTHER PUBLICATIONS

Gennum—"GX4002 2x2 14.025Gb/s Crosspoint Switch with Trace Equalization and Output De-Emphasis", 3 pages; Dated Dec. 2010.*

* cited by examiner

*Primary Examiner* — Brian Misiura
(74) *Attorney, Agent, or Firm* — Marshall & Melhorn, LLC

(57) ABSTRACT

A crosspoint selector switch for simultaneously supporting multiple data formats having different switch reconfiguration timing requirements, comprising; a configurable switch section for selectively connecting outputs thereof to receive data from respective inputs thereof in response to operational switch data; and a configuration section operatively connected to provide the operational switch data to the switch section, the configuration section storing switch configuration data supporting multiple different configurations of the switch section, the configuration section being operative to receive different operational update commands each associated with a different configuration for the switch section and update the operational switch data from the stored switch configuration data to reconfigure the switch section in dependence on which of the different operational update commands is received.

15 Claims, 6 Drawing Sheets

CROSSPOINT SWITCH FOR USE IN VIDEO AND OTHER APPLICATIONS

This application claims the benefit of and priority to U.S. patent application Ser. No. 61/146,135 filed Jan. 21, 2009, the contents of which are incorporated herein by reference.

BACKGROUND

The present document relates to crosspoint switches for use in video and other applications.

Crosspoint selector switches are used in video switching or routing. Such switches have inputs and outputs and transmit data from inputs to appropriate outputs.

SUMMARY

According to an example embodiment is a crosspoint selector switch for simultaneously supporting multiple data formats having different switch reconfiguration timing requirements. The crosspoint selector switch includes a configurable switch section for selectively connecting outputs thereof to receive data from respective inputs thereof in response to operational switch data; and a configuration section operatively connected to provide the operational switch data to the switch section, the configuration section storing switch configuration data supporting multiple different configurations of the switch section, the configuration section being operative to receive different operational update commands each associated with a different configuration for the switch section and update the operational switch data from the stored switch configuration data to reconfigure the switch section in dependence on which of the different operational update commands is received.

According to another example embodiment is a method for supporting multiple data formats having different switch reconfiguration timing requirements at a crosspoint selector switch having a configurable switch section for selectively connecting outputs thereof to receive data from respective inputs thereof in response to operational switch data; and a configuration section operatively connected to provide the operational switch data to the switch section. The method includes: preloading the configuration section with switch configuration data supporting multiple different switch configurations; receiving one of a plurality of possible operational update commands at the configuration section; and updating the operational switch data provided to the switch section selectively from the preloaded switch configuration data in dependence on which of the plurality of possible operational update commands is received by the configuration section.

According to another embodiment is a crosspoint selector switch comprising: a plurality of switches each having a respective output and being configurable by switch configuration bits to connect the respective output to one of a plurality of inputs; a plurality of operational registers for applying the switch configuration bits to the plurality of switches, each of the operational registers storing switch configuration bits for configuring a corresponding one of the switches; a plurality of configuration registers, each of the configuration registers storing (i) updated switch configuration bits for future transfer to a corresponding one of the operational registers and (ii) update selector bits that identify one of a plurality of possible update commands; and an update enable circuit for receiving a plurality of possible update commands, wherein for each update command received the update enable circuit selectively transfers the updated switch configuration bits from any configuration register storing update selector bits that identify the received update command to the corresponding operational register.

BRIEF DESCRIPTION OF THE DRAWINGS

The same reference numerals may be used throughout the Figures to denote items having the same or similar functions.

DESCRIPTION

Semiconductor implemented crosspoint selector switches interconnect equipment through a configurable crosspoint switch matrix or other configurable crosspoint switch architecture. The larger that crosspoint selector switches become, the greater number of configuration changes are required in a given time. In the case of video, the time for configuration change is strictly defined by industry standards.

Figure 1:
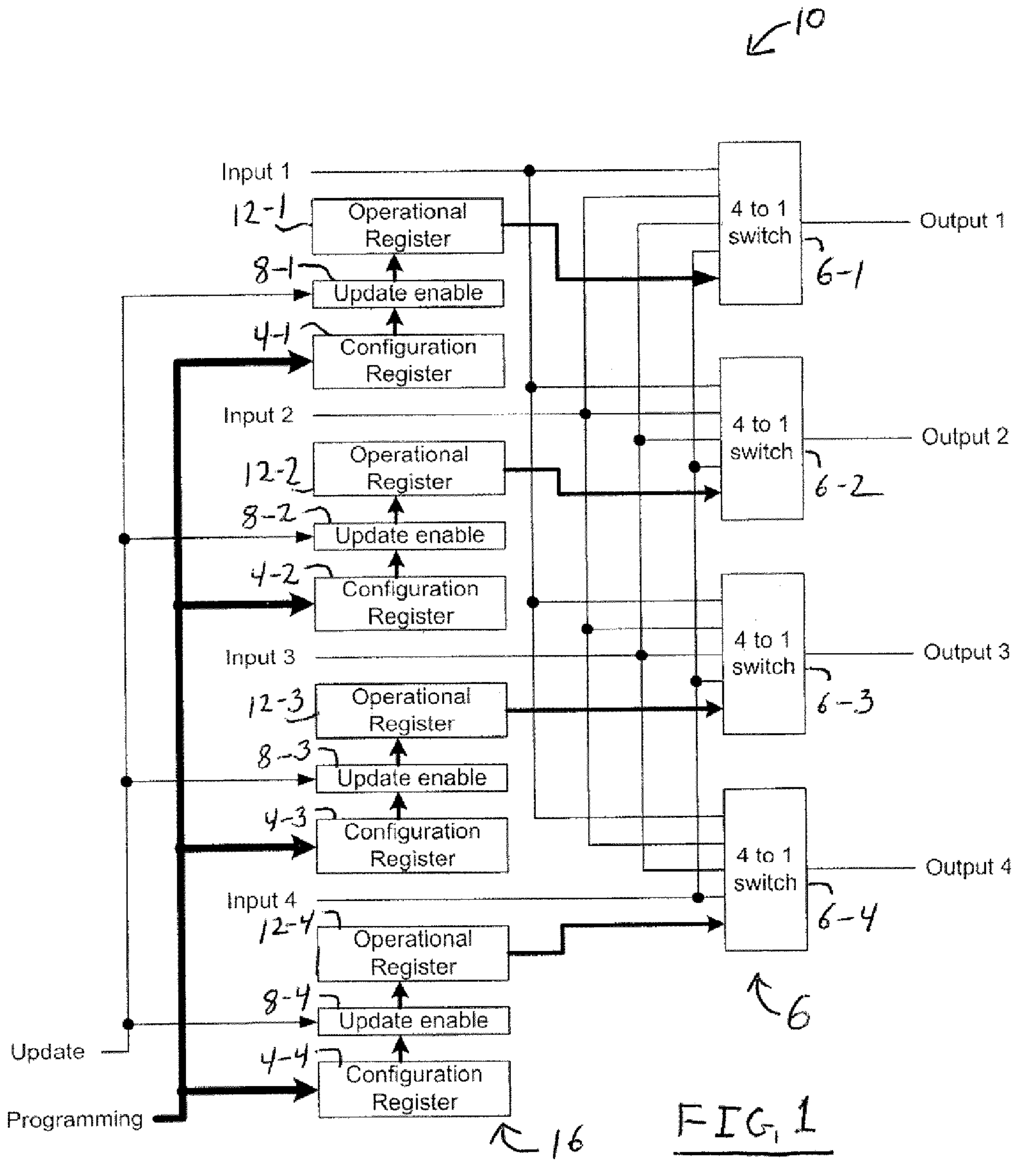
FIG. 1 is a block diagram representation of an example of a crosspoint switch.

FIG. 1 conceptually illustrates a configurable 4×4 crosspoint switch 10 that will be described to providing an understanding of the environment in which example embodiments of the invention described herein operate. The crosspoint switch 10 includes a switch configuration section 16 and a switch section 6. The switch section 6, which could use a matrix switch architecture for example, operates under configuration instructions received from the configuration section 16 to selectively connect a plurality of outputs (shown as Output 1-Output 4 in FIG. 1) to respective inputs (shown as Input1-Input 4 in FIG. 1). In the example of FIG. 1, the core switch section 6 is illustrated as comprising four 4 to 1 switches 6-1 to 6-4, each of which is associated with a respective output, Output 1 to Output 4 and is connected to all four inputs.

The configuration section 16 includes an operational register section, represented in FIG. 1 as a separate operational register 12-1, 12-2, 12-3 and 12-4 for each output (Output 1, Output 2, Output 3, Output 4) of the crosspoint core switch section 6. Thus, each switch 6-1, 6-2, 6-3 and 6-4 has an associated output (Output 1, Output 2, Output 3, Output 4) and an associated operational register (12-1, 12-2, 12-3 and 12-4) respectively. The operational registers 12-1 to 12-4 are each programmed to cause their respective output (Output 1-Output 4) to be connected by their respective switch to the correct input (Input 1, Input 2, Input 3, Input 4) as required at the moment. The configuration section 16 also includes a configuration register section, represented in FIG. 1 as a separate configuration register 4-1, 4-2, 4-3, and 4-4 for each output (Output 1, Output 2, Output 3, Output 4) of the crospoint core switch section 6. The configuration registers 4-1 to 4-4 are pre-programmed with the data that will be required by operational registers 12-1 to 12-4, respectively, to connect the correct inputs with the correct outputs once an update signal is received which indicates a switch configuration change time. The configuration section 16 further includes update enable functions 8-1 to 8-4, as represented in FIG. 1, which cause the information from configuration registers 4-1 to 4-4 to be loaded into operational registers 12-1 to 12-4, respectively, upon the occurrence of an update signal. Such a configuration is a "load and go" system, in which a configuration register or registers have been programmed in the time leading up to a reconfiguration and a single update command executes a reconfiguration through the transfer of this pre-programmed information from the configuration registers 4-1 to 4-4 to the operational registers 12-1 to 12-4, respectively.

With an increase in the number of video formats used within the broadcast industry, a broadcast facility may be required to handle video content in several formats. These formats all have different times in a video frame when they should be switched. The use of multiple video formats combined with a large centralised router which handles many or all of the video signals in a facility increases the probability that a single large router will need to switch many signals in groups, with each group operating at a different format and so having a different switching time. Although the switching times for the different formats are different, they will often differ by only a short time. This makes it difficult to reconfigure the crosspoint switch, which is the core of the router, between switching events.

Figure 2:
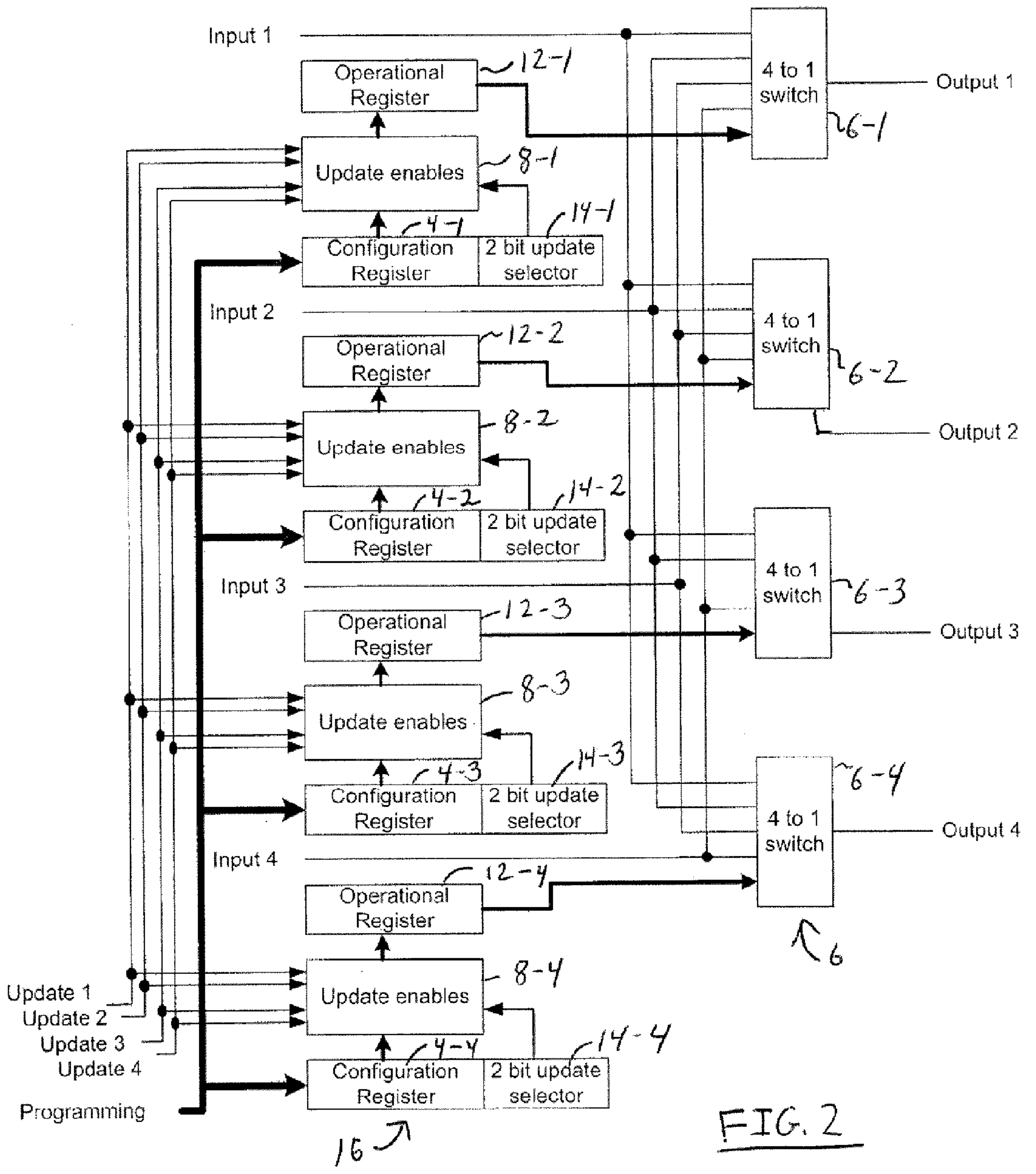
FIG. 2 is a block diagram representation of a crosspoint switch according to one example embodiment of the invention.

Example embodiments of the present invention are directed to a crosspoint switch that can support a number of different switching times, such that for multiple video environments each format can be switched independently. In this regard, FIG. 2 shows a crosspoint switch 100 according to an example embodiment of the invention. The crosspoint switch 100 has common features with crosspoint switch 10 described above, but has differences that are described below.

The crosspoint switch 100 varies from crosspoint switch 10 in that instead of receiving just a single update signal or command, the crosspoint switch 100 is configured to receive multiple operational update reconfiguration signals or commands (Update 1, Update 2, Update 3, Update 4) and each configuration register 4-1 to 4-2 of configuration section 16 is expanded to include additional bits (update selector bits 14-1 to 14-4, respectively) that identify which of the plurality of update reconfiguration update commands is to be obeyed. Thus, the configuration information provided to each configuration register 4-1 to 4-2 will include switch configuration data in the form of switch configuration bits identifying what input the configuration register's respective output (Output-1 to Output 4) should be connected to at a future time, as well as update selector data in the from of update selector bits identifying the update command that will trigger the change in switch configuration for the configuration register's respective switch (6-1 to 6-4). For a particular pair of operational and configuration registers 12-*i* and 4-*i* (where 1<=i<=4 in the illustrated example), when an update command (Update 1-Update 4) is received, the update input function 8-*i* will determine based on the update selector bits 14-*i* whether to ignore the update command or to transfer the switch configuration data from the configuration register 4-*i* to the operational register 12-*i*. The reconfiguration update command can be implemented by a software command or may be implemented by raising or lowering the voltage on a dedicated input to the crosspoint switch.

As will be appreciated from the example switch 100 represented in FIG. 2, the update enable selector function 14-1 to 14-2 informs, in dependence on the update selector bits, the operational register 21-1 to 21-4 for a switch 6-1 to 6-4 that it should reconfigure when one of four separate reconfiguration update inputs is activated. This allows the crosspoint switch 100 to operate with four differently timed formats. This also allows flexibility as to which output is operating at which format. In one example embodiment, the crosspoint switch is divided into four blocks, each block with its own fixed reconfiguration command line.

Accordingly, in the embodiment illustrated in FIG. 2, each switch output (Output i) has a corresponding switch 6-*i*, a corresponding operational register 12-*i*, a corresponding update enable function 8-*i*, and a corresponding configuration register 4-*i*. The configuration register 4-*i* is programmed with switch configuration bits that define which input (Input 1 to Input 4) the switch 6-*i* will switch the output 6-*i* to at the next reconfiguration event for the switch 6-*i*. In addition to the switch configuration bits, configuration register 4-*i* is programmed with update selector bits that identify which of the update signals will trigger the update enable function 8-*i* to transfer the switch configuration bits from the configuration register 4-*i* to the operational register 8-*i*, thereby reconfiguring the corresponding switch 6-*i*. Although only four switches are shown in FIG. 2, in a larger switch implementation, the switches can be grouped into sub-sets of switches, with the update selector bits being set to a common value in the configuration registers associated with each of the switches in a sub-set of switches. This effectively allows a crosspoint switch to be partitioned into multiple subgroups of switches, with each subgroup being responsive to a different update signal such that each subgroup can support a video format having a switching time different than the video formats supported by other subgroups.

Figure 3:
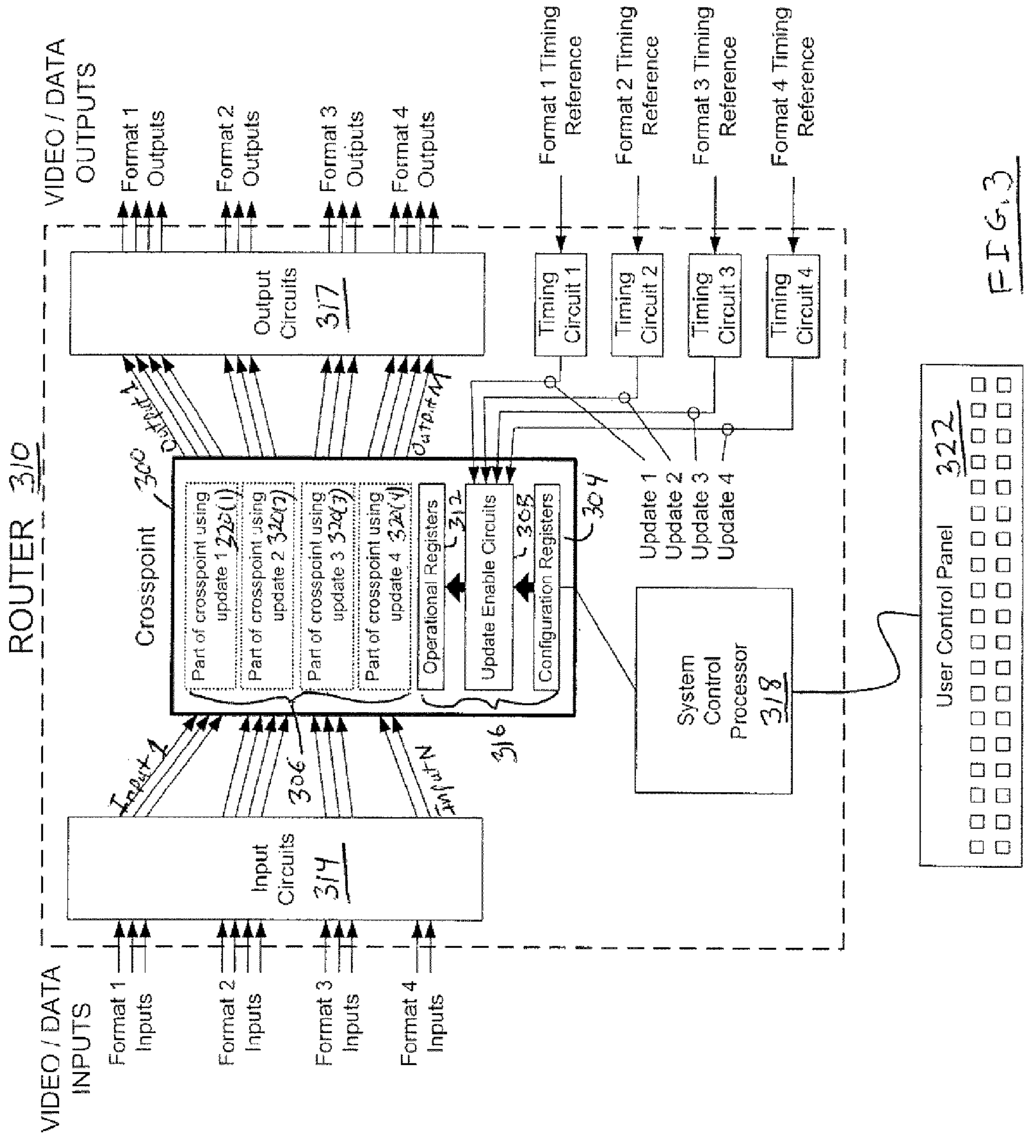
FIG. 3 is a block diagram representation of a router system incorporating a crosspoint switch similar to the crosspoint switch of FIG. 2 according to example embodiments.

In order to provide an example of the environment in which a multiple-update-command-enabled crosspoint switch that is partitioned into multiple subgroups may operate in, FIG. 3 illustrates a router system 310 for supporting multiple different video formats having different switch reconfiguration timing formants.

At the core of the router system 310 is an N-input by M-output crosspoint selector switch 300, which may be implemented for example using a larger version of the crosspoint switch 100 disclosed above. M and N may be the same number or a different number. By way of non-limiting example, M and N could both be equal to 288. The router system 310 includes conventional input and output circuits 314 and 317 for applying data to the inputs (Input 1-Input N) of the crosspoint switch 300 and receiving data from the outputs (Output 1-Output M) of crosspoint switch 300, respectively. The operation of router system 310, including crosspoint switch 300, is controlled by a system control processor 318. A user control panel 320 is connected to the system control processor to allow a user to control operation of the system control processor 318. In the example shown in FIG. 3, the router system 310 simultaneously supports up to four different video formats with different switch reconfiguration timing requirements. Crosspoint switch 300 includes a switch section 306 and a configuration section 316. The switch section 306, which may for example be implemented as a differential crosspoint switch matrix, includes a plurality of outputs (Output 1-Output M) that are selectively connected to inputs (Input 1-Input N) under the control of configuration section 316. Configuration section 316 includes an operational register section 312, update enable circuits 308 and a configuration register section 304. Operational register section 312 provides operational switch configuration data that actively controls the switch section 306 at any given time, and configuration register section 304 that stores switch configuration data for upcoming switch reconfiguration events.

In example embodiments, the router system 310 can include timing circuits (Timing Circuit 1 to Timing Circuit 4) that each receive a respective timing reference signal for one of the four different video formats (Format 1 Timing Reference to Format 4 Timing Reference) and generate based thereon update commands (Update 1 to Update 4) corresponding to the switch reconfiguration change times required for the respective video formats. In some example embodiments, the relative switch reconfiguration timing of the multiple formats may be known in which case a single timing reference could be used to generate all four update signals. In the example of FIG. 3, update enable circuits 308 dictate what switch configuration data is used by the operational register section 311 in response to update signals Update 1 to Update 4.

As shown in FIG. 3, the crosspoint switch section 306 is nominally sectioned into four partitions 320(1) to 320(4), which are each associated with a respective video format. For example, the router system 310 may be configured at a certain time to use a defined group of switch inputs and switch outputs for Format 1 data, a further defined group of switch inputs and switch outputs for Format 2 data, and so on. Which groups of switches and outputs are used for which video format can be configured through the system control processor 318 in response to information received from user control panel 322, for example.

Figure 4:
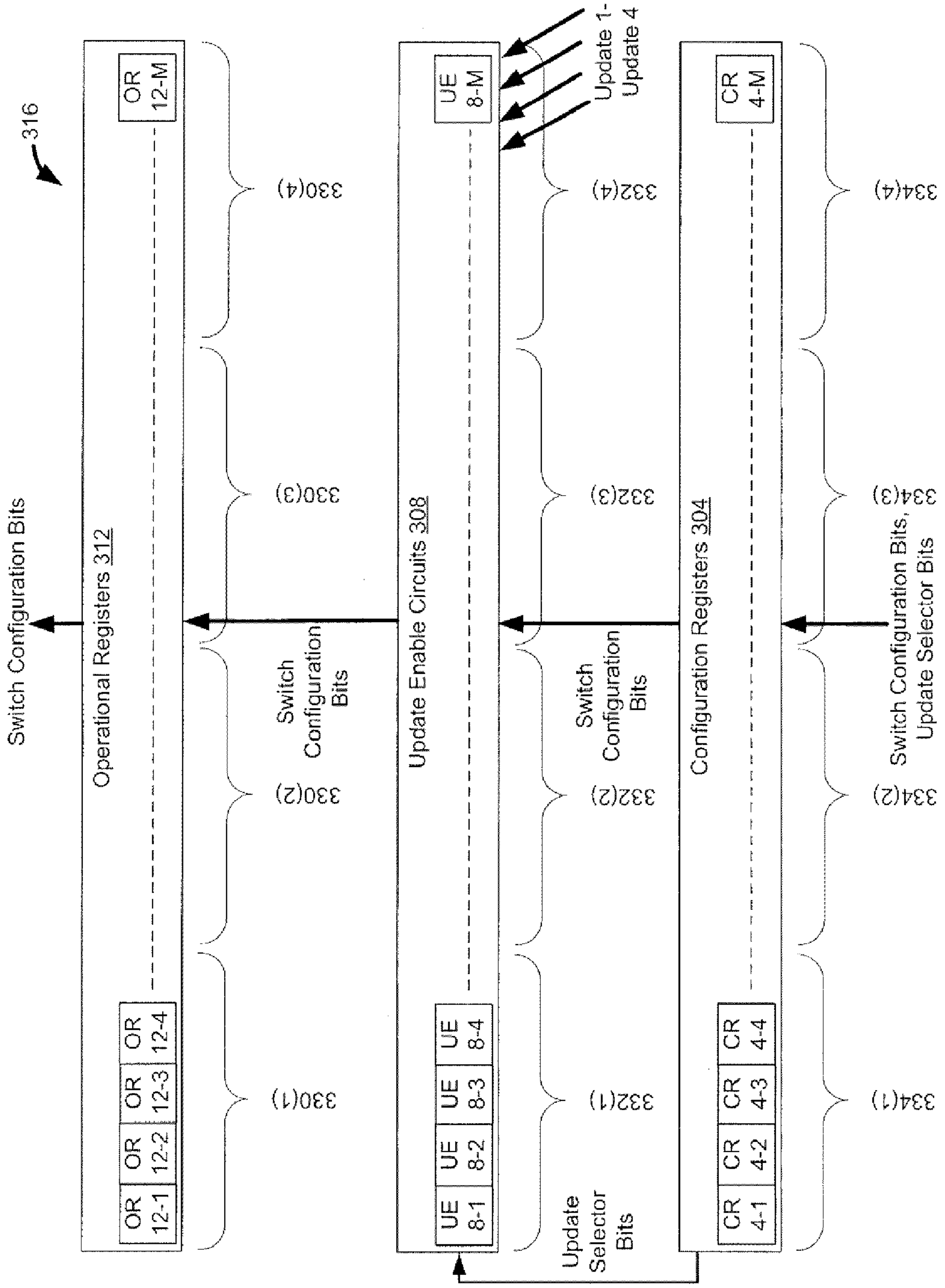
FIG. 4 is a block diagram representation of a configuration section of a crosspoint switch according to example embodiments.

In embodiments where the crosspoint switch 300 is implemented using a configuration the same as or similar to that applied to crosspoint switch 100 discussed above, the configuration register section 304 and the operational register section 312 will each include a respective register set that is subdivided into multiple register sub-sets so that each store switch configuration data corresponding to a respective crosspoint switch partition 320(1) to 320(4). In this regard, reference is made to FIG. 4 which shows a block diagram representation of configuration section 316 in greater detail according to one example embodiment. In the embodiment of FIG. 4, the operational register section 312 includes operational registers ("OR") 12-1 to 12-M corresponding to the switch outputs (Output 1 to Output M), respectively. The switch configuration of switch section 306 is directly controlled by the data contained in the operational register section 312 such that switch configuration bits latched into each of the operational registers 12-1 to 12M define at the present moment which input (Input 1 to Input N) the operational register's corresponding output (Output 1 to Output M) is presently switched to. As illustrated in the example of FIG. 4, the set of operational registers 12-1 to 12-M is subdivided into sub-sets 330(1) to 330(4), each of which correspond to a respective switch partition 320(1) to 320(4). Thus, in the illustrated example, the switch connections implemented by crosspoint switch partition 320(1) are configured by the configuration data stored in operational register subset 330(1), the switch connections implemented by crosspoint switch partition 320(2) are configured by the configuration data stored in operational register subset 330(2), and so-on.

The configuration register section 304 includes configuration registers ("CR") 4-1 to 4-M corresponding to respective operational registers 12-1 to 12-M and switch outputs Output 1-Output M. As with crosspoint switch 100, the configuration registers 4-1 to 4-M store switch configuration bits that define a future switch configuration in respect of their corresponding outputs (Output 1 to Output M). In addition to switch configuration bits, each configuration register 4-1 to 4-M also stores update selector bits that identify which update command (Update 1-Update 4) will cause the switch configuration bits contained in the configuration registers 4-1 to 4-M to be transferred to respective operational registers 12-1 to 12-M. As illustrated in the example of FIG. 4, the set of configuration registers 4-1 to 4-M is subdivided into sub-sets 334(1) to 334(4), each of which correspond to a respective operational register subset 330(1) to 330(4) and respective switch partition 320(1) to 320(4). In example embodiments, the update selector bits stored for each configuration register within a configuration register subset will be the same—thus all of the configuration registers of register 334(1) have the same update selector bits, all of the configuration registers of register 334(2) have the same update selector bits and so on.

The transfer of switch configuration bits from the configuration registers to the operational registers 312 is implemented by update enable circuits 308, which in an example embodiment includes update enable functions (UE) 8-1 to 8-M each corresponding to a respective operational register 12-1 to 12-M and a respective configuration register 4-1 to 4-M. Each update enable function 8-*b* (where 1<=b<=M) will cause the switch configuration data bits from its respective configuration register 4-*b* to be transferred to the corresponding operational register 12-*b* only when an update command is received by the update enable circuits 308 that corresponds to the update selector bits set for the configuration register 4-*b*. Thus, the set of update enable functions 8-1 to 8-M is divided up into subsets 332(1) to 332(4) that each cause a respective switch partition 320(1) to 320(4) to be selectively reconfigured in response to a respective update command (Update1-Update 4) without affecting the switch configuration of the remaining switch partitions.

Prior to a series of switch reconfiguration events, the configuration registers 4-1 to 4-M can each be preloaded with switch configuration bits and selector enable bits. Each of the configuration registers within a configuration register subset 334(1) to 334(4) will be associated with the same selector enable bits. When an update command (update 1-Update 4) for a particular video format is received, the update enable circuits 312 causes the switch configuration data from the appropriate configuration register subset 334(1) to 334(4) to be loaded into the operational register subset 330(1) to 330(4) that controls the part 320(1) to 320(4) of the crosspoint switch section 306 that has been allocated to that particular video format. Accordingly, the only part of the operational register section 312 that is updated is the subset of registers that control the part of the crosspoint switch that supports the video format for which the update signal was generated.

In the example shown in FIG. 3, four update enable command lines (Update 1 to Update 4) are present to support four different video formats, however more or fewer video formats could be supported by adapting the number of update selector bits and update enable commands used in implementing the router 310. For example, using three update selector bits and eight update enable command lines would allow the crosspoint switch to be partitioned into eight subgroups thereby supporting eight different video formats. Accordingly, in the embodiments discussed herein, the number four for the number of update commands is simply an example. More or fewer can be chosen using the same principles.

Figure 5:
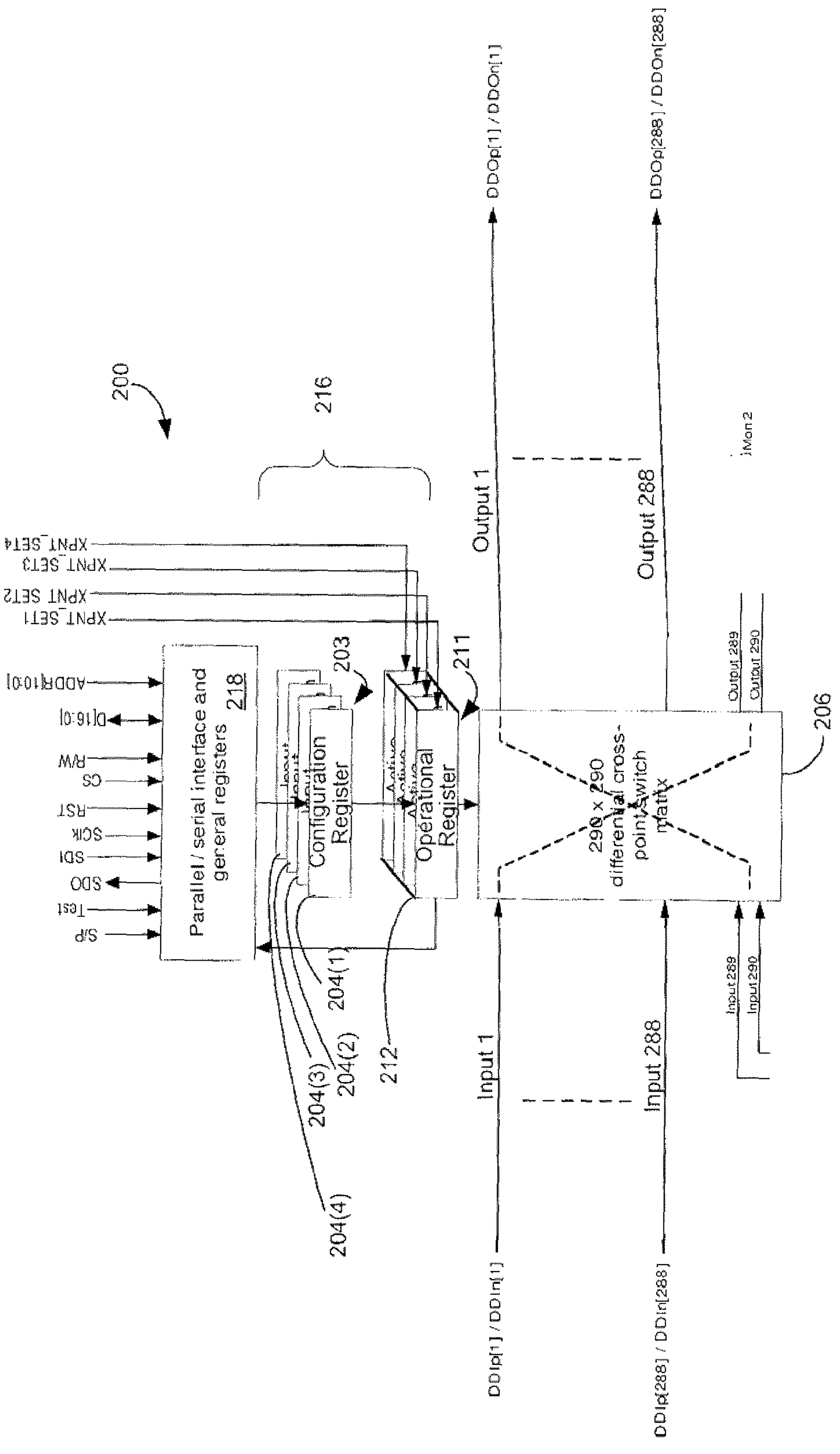
FIG. 5 is a block diagram representation of a crosspoint switch according to another example embodiment of the invention.

Another example embodiment of a crosspoint selector switch 200 is shown in FIG. 5, which includes a configuration section 216 and a core cross-point switch section which in the illustrated embodiment is a differential cross-point switch matrix 206. The switch matrix 206 selectively switches its outputs to respective inputs based on switch configuration data received from the configuration section 216. In the illustrated embodiment, the switch matrix 206 is shown as a 290×290 differential cross-point switch matrix having 290 inputs (Input 1 to Input 290) and 290 outputs (Output 1 to Output 290), however other switch matrix sizes having more or fewer inputs or output could be used. Similar to crosspoint selector switch 100, the configuration section 216 of crosspoint switch 200 includes a configuration register section 203 and an operational register section 211.

The configuration register section 203 of crosspoint selector switch 200 includes multiple configuration register sets 204(1) to 204(4) with configuration data transfer from the different configuration register sets to the switches' operational register section 212 initiated by a different operational update reconfiguration command (XPNT_SET1, XPNT_SET2, XPNT_SET3, XPNT_SET4) for each configuration register set. In particular, the configuration register section 203 includes multiple configuration register sets 204(1) to 204(*n*), with each configuration register set 204(*i*) (where 1<=i<=n) having multiple registers such that each configuration register set 204(*i*) can store a complete configuration data set of switch configuration bits for the entire switch matrix 206. Accordingly, in one example embodiment of a 290×290 switch matrix, the configuration register set 204(1) would include a complete set of 290 registers or latches, the configuration register set 204(2) would also include a complete set of 290 registers or latches, and so on for the other configuration register sets 204(3) to 204(*n*). The operational register section 211 includes a operational register set 212 that stores an active or operational data set for the entire switch matrix 206 that defines at any given time which switch output (Output j, where 1<=j<=290) is connected to which input (Input k, which 1<=k<=290). Accordingly, in an example embodiment of a 290×290 switch matrix, the operational register set 212 would include a set of 290 registers or latches. Thus, at any given moment, the switch matrix 206 is configured according to the contents of the operation register set 212. The configuration data loaded into the operational register set 212 can come from any one of the n configuration register sets 204(1) to 204(*n*) depending on which of the operational update inputs XPNT_SET1 to XPNT_SETn is activated at switch configuration change time. For example, in the embodiment of FIG. 3, an update signal on the update input XPNT_SET1 instructs the operational register 212 to load and use as the operational switch data set the switch configuration data preloaded onto configuration register set 204(1), an update signal on the update input XPNT_SET2 instructs the operational register 212 to load and use as the operational switch data set the switch configuration data preloaded onto configuration register set 204(2), an update signal on the update input XPNT_SET3 instructs the operational register 212 to load and use as the operational switch data set the switch configuration data preloaded onto configuration register set 204(3), and an update signal on the update input XPNT_SET4 instructs the operational register 212 to load and use as the operational switch data set the switch configuration data preloaded onto configuration register set 204(4). The data sets preloaded into the different configuration register sets 201(1) to 204(4) will differ only to the extent that the switch configuration changes at each switch configuration change time. In the illustrated embodiment, programming of the configuration register sets is effected through an interface section 218 that includes a parallel to serial interface and general registers. In the illustrated example, update enable circuits are included as part of the operational register section 211 for receiving the respective update commands XPNT_SET1 to XPNT_SETn and causing the correct switch configuration data to be loaded into the operational register 212 in response thereto.

In the crosspoint switch 200 of FIG. 5, a user would program the configuration for the entire crosspoint switch 200 for each configuration time. For example, if "switch 1", implemented by switch matrix 206, is to change the connection of Output 1 from "Input 1" to "Input 2" using a video format with an early switch point, and "switch 2", implemented by switch matrix 206, is to change the connection of Output 2 from "input 3" to "input 4" using a data format with a later switch point, the following process would be followed:

(i) Before any of the switching takes place, the switch 200 is operating with "Switch 1" selecting Input 1 and "Switch 2" selecting Input 3, under the control of the operational register set 212.

(ii) The user would programme a set of configuration registers, for example configuration register set 204(1), with "switch 1" selecting Input 2 and "switch 2" remaining on "Input 3".

(iii) The user would then program a separate set of configuration registers, for example configuration register set 204(2), with "switch 1" selecting Input 2 and "switch 2" selecting Input 4.

(iv) At the switching point (i.e. switch configuration change time) for the first format, when "switch 1" is to change from Input 1 to Input 2, the contents of configuration register set 204(1) are transferred to the operational register set 212 by the first reconfiguration command XPNT_SET1, changing "switch 1" but leaving "switch 2" unchanged.

(v) At the switching point (i.e. switch configuration change time) for the second format, when "switch 2" is to change from Input 3 to Input 4, the contents of configuration register set 204(2) are transferred to the operational registers 212 by the second reconfiguration command, changing "switch 2" to Input 4 and leaving "switch 1" unchanged.

(In the example provided in this paragraph, "switch 1" and "switch 2" are each implemented by the cross-point switch matrix 206).

Figure 6:
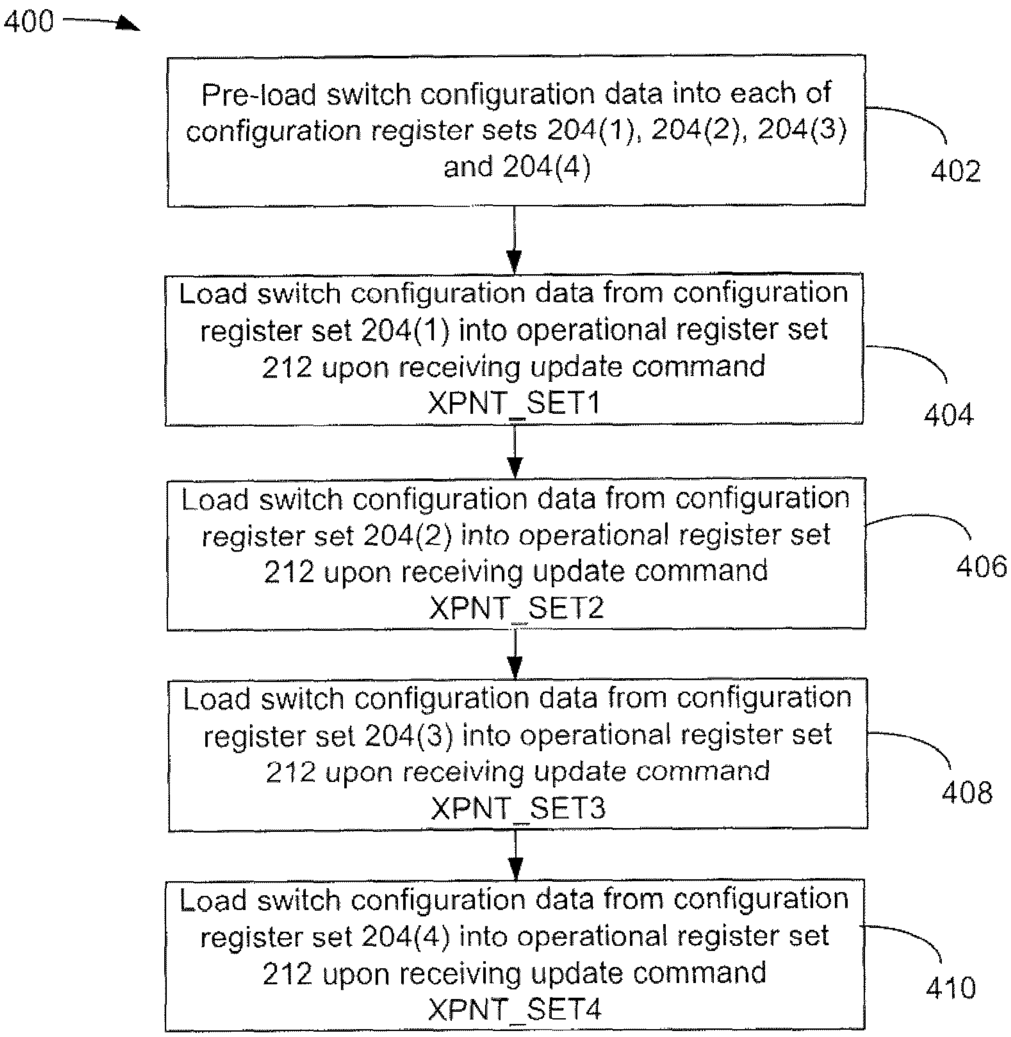
FIG. 6 is a flow diagram illustrating operation of the crosspoint switch of FIG. 5 according to an example embodiment.

Operation of an example embodiment of the crosspoint switch 200 that is configured to support four different video formats that have four successive switch configuration change times will be further explained with reference to an example switch configuration process 400 represented in a block diagram in FIG. 6. As indicated at action 402, the configuration register sets 204(1), 204(2), 204(3) and 204(4) are each preloaded with respective switch configuration data. In particular, the configuration register set 204(1) is preloaded with the switch configuration data required at a configuration change time for a first video format. In one example embodiment, the switch configuration data loaded onto the configuration register set 204(1) includes a complete data set for the entire switch matrix 206 identifying which one of the respective Input 1 to Input 290 each of the switch Output 1 to Output 290 is to be connected to at the switch configuration change time for the first video format. The configuration register set 204(2) is preloaded with the switch configuration data required at the switch configuration change time for a second video format. The switch configuration data loaded onto the configuration register set 204(2) also includes a complete data set for the entire switch matrix 206, however, the data set loaded into configuration register set 204(2) will be identical to the data set loaded into configuration register set 204(1) with the exception of the data specifying connections for the switch matrix inputs and outputs that need to be reconfigured at the switch reconfiguration time for the second video format.

Similarly, the configuration register set 204(3) is preloaded with the switch configuration data for the switch configuration change time associated with a third video format. The switch configuration data loaded onto the configuration register set 204(3) also includes a complete data set for the entire switch matrix 206, however, the data set loaded into configuration register set 204(3) will be identical to the data set loaded into configuration register set 204(2) with the exception of the data specifying connections for the switch matrix inputs and outputs that need to be reconfigured at the switch reconfiguration time for the third video format. The configuration register set 204(4) is preloaded with the switch configuration data required for a configuration change time associated with a fourth video format. The switch configuration data loaded onto the configuration register set 204(4) also includes a complete data set for the entire switch matrix 206, however, the data set loaded into configuration register set 204(4) will be identical to the data set loaded into configuration register set 204(3) with the exception of the data specifying connections for the switch matrix inputs and outputs that require switching for the forth video format.

As indicated at action 404, when the switch configuration change time associated with the first video format occurs, the switch configuration data set from configuration register set 204(1) is loaded into operational register set 212 and applied to switch matrix 206 in response to update command XPNT_SET1. Similarly, as indicated at action 406, when the switch configuration change time associated with the second video format occurs, the switch configuration data set from configuration register set 204(2) is loaded into operational register set 212 and applied to switch matrix 206 in response to update command XPNT_SET2. Although a complete data set for the switch matrix 206 is loaded into the operational register set 212 upon receiving the update command XPNT_SET2, only the switches in switch matrix 206 that are being used for the second video format are affected as the configuration data for the switches (and corresponding inputs and outputs) being used for the other three video formats remain the same. As indicated at action 408, when the switch configuration change time associated with the third video format occurs, the switch configuration data set from configuration register set 204(3) is loaded into operational register set 212 and applied to switch matrix 206 in response to update command XPNT_SET3. Again, although a complete data set for the switch matrix 206 is loaded into the operational register set 212 upon receiving the update command XPNT_SET3, only the switches in switch matrix 206 that are being used for the third video format are affected. As indicated at action 410, when the switch configuration change time associated with the fourth video format occurs, the switch configuration data set from configuration register set 204(4) is loaded into operational register set 212 and applied to switch matrix 206 in response to update command XPNT_SET4. Again, although a complete data set for the switch matrix 206 is loaded into the operational register set 212 upon receiving the update command XPNT_SET4, only the switches in switch matrix 206 that are being used for the fourth video format are affected.

The switch reconfiguration method applied to switch 200 achieves a similar result as the method of switches 100 and 300, allowing a number of reconfiguration update signals or commands to change different switches in the overall crosspoint selector switch. In example embodiments, crosspoint switches 100, 200 and 300 can each be implemented as monolithic integrated circuits using for example CMOS technology.

In at least some example embodiments, the methods and configurations described above can be used to implement crosspoint selector switches for use in, among other things, implementation large n×n cascaded routers/switch fabrics for one or more of: professional broadcast applications; enterprise and carrier applications; high speed automated test equipment; 10 GbE and infiniband networks.

In some example embodiments the operational registers can be implemented as latches storing the operational switch data used to configure the switch at a given time and the configuration registers implemented as latches storing the switch configuration data for future switch reconfiguration events and the enable command select bits in the case of switches 100, 300)

In at least some example embodiments, the methods and configurations described above can be used to implement a crosspoint selector switch that features multiple user programmable switch partitions allowing independent configuration and update of each partition. Such a feature is suited for multi-format SDI (Serial Digital Interface) routers where different frame rates with different update times need to be accommodated. In at least some example embodiments, the methods and configurations described above may for example be used in the implementation of a crosspoint selector switch that supports broadcast and multi-cast modes and data rates from DC to into multiple Gb/s.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A crosspoint selector switch for simultaneously supporting multiple data formats having different switch reconfiguration timing requirements, comprising:

a configurable switch section for selectively connecting outputs thereof to receive data from respective inputs thereof in response to operational switch data; and a configuration section operatively connected to provide the operational switch data to the switch section the configuration section being operative to receive different operational update commands each associated with a different configuration for the switch section, the configuration section including:

a configuration register section for storing switch configuration data supporting multiple different configurations of the switch section, and an operational register section operative to update the operational switch data from the stored switch configuration data to reconfigure the switch section in dependence on which of the different operational update commands is received.

2. The crosspoint selector switch of claim 1 wherein the configuration register section includes a plurality of configuration register sets each being associated with one of the operational update commands and storing a respective set of switch configuration data, and the operational register section includes an operational register set, wherein upon receiving one of the operational update commands the configuration section causes the switch configuration data stored by the configuration register set associated with the received operational update command to be transferred to the operational register set for use as the operational switch data.

3. The crosspoint selector switch of claim 2 wherein each configuration register set stores a set of switch configuration data for the entire switch section.

4. The crosspoint selector switch of claim 1 wherein the configuration register section includes a plurality of configuration registers and the operational register section includes a plurality of operational registers, wherein each of the operational update commands is associated with a respective subset of the configuration registers, wherein the configuration section causes switch configuration data from a subset of the configuration registers to be selectively transferred to a subset of the operational registers upon receiving the operational update command that is associated with that subset of the configuration registers.

5. The crosspoint selector switch of claim 4 wherein the configuration registers in each subset of configuration registers stores update selector data that identifies the operational update command that the subset of configuration registers is associated with.

6. The crosspoint selector switch of claim 1 wherein the operational register section includes operational registers storing the operational switch data, the configuration register section includes configuration registers storing the switch configuration data, and the configuration section further comprises an update enable circuit, wherein the configuration registers each have associated update selector data that corresponds to one of the update commands, and the update enable circuit is operative to, upon receiving one of the update commands, selectively transfer to operational registers switch configuration data from corresponding configuration registers whose associated update selector data corresponds to the received update command.

7. The crosspoint selector switch of claim 6 wherein the configuration section includes a separate input line for receiving each of the different operational update commands.

8. The crosspoint selector switch of claim 7 wherein the configuration section includes at least four input line for receiving each of the different operational update commands.

9. The crosspoint selector switch of any one of claim 8 wherein the switch section comprises a differential crosspoint switch matrix.

10. A method for supporting multiple data formats having different switch reconfiguration timing requirements at a crosspoint selector switch having a configurable switch section for selectively connecting outputs thereof to receive data from respective inputs thereof in response to operational switch data; and a configuration section operatively connected to provide the operational switch data to the switch section, the method comprising:

preloading the configuration section with switch configuration data supporting multiple different switch configurations; and receiving one of a plurality of possible operational update commands at the configuration section, and updating the operational switch data provided to the switch section selectively from the preloaded switch configuration data in dependence on which of the plurality of possible operational update commands is received by the configuration section, wherein the configuration section includes a plurality of configuration registers and corresponding operational registers, the operational registers providing the operational switch data to the data section and the configuration registers storing the switch configuration data, the configuration registers each having associated update selector data that identifies one of the operational update commands, wherein updating the operational switch data comprises enabling the configuration registers that are associated with update selector data that identifies the received operational update to transfer switch configuration data to the corresponding operational registers.

11. The method of claim 10 wherein preloading the configuration section with switch configuration data supporting multiple different switch configurations comprises loading a first set of switch configuration data associated with a first operational update command and a first data format, a second set of switch configuration data associated with a second operational update command and a second data format, and at least a third set of switch configuration data associated with a third operational update command and a third data format.

12. The method of claim 11 wherein each of the first second and third sets of switch configuration data include configuration data for configuring substantially the entire switch section.

13. The method of claim 12 wherein the first, second and third data formats each require a successive respective switch reconfiguration change time, wherein the second set of switch configuration data is the same as the first set of switch configuration data except for configuration data required to reconfigure the switch section for the second data format, and the third set of switch configuration data is the same as the second set of switch configuration data except for configuration data required to reconfigure the switch section for the third data format.

14. A crosspoint selector switch comprising:

a plurality of switches each having a respective output and being configurable by switch configuration bits to connect the respective output to one of a plurality of inputs;

a plurality of operational registers for applying the switch configuration bits to the plurality of switches, each of the operational registers storing switch configuration bits for configuring a corresponding one of the switches;

a plurality of configuration registers, each of the configuration registers storing (i) updated switch configuration bits for future transfer to a corresponding one of the operational registers and (ii) update selector bits that identify one of a plurality of possible update commands; and an update enable circuit for receiving a plurality of possible update commands, wherein for each update command received the update enable circuit selectively transfers the updated switch configuration bits from any configuration register storing update selector bits that identify the received update command to the corresponding operational register.

15. The crosspoint selector switch of claim 14 wherein the plurality of switches are implemented using a crosspoint switch matrix.

* * * * *

UNITED STATES PATENT AND TRADEMARK OFFICE

CERTIFICATE OF CORRECTION

PATENT NO. : 8,694,711 B2
APPLICATION NO. : 13/138228
DATED : April 8, 2014
INVENTOR(S) : Seth-Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 306 days.

Signed and Sealed this
Twenty-ninth Day of September, 2015

Michelle K. Lee

Michelle K. Lee
*Director of the United States Patent and Trademark Office*